March 12, 1940.  K. A. PRICE  2,193,342

DOMESTIC MOLD FOR FROZEN STICK CONFECTIONS

Filed Oct. 15, 1938

KENNETH A. PRICE
INVENTOR.

BY
ATTORNEY.

Patented Mar. 12, 1940

2,193,342

UNITED STATES PATENT OFFICE 2,193,342

DOMESTIC MOLD FOR FROZEN STICK CONFECTIONS

Kenneth A. Price, Los Angeles, Calif.

Application October 15, 1938, Serial No. 235,250

4 Claims. (Cl. 107—19)

My invention relates to a mold for frozen stick confections and has particular reference to a mold especially adapted for the domestic freezing of confections about a stick which serves as a handle for the finished product.

The use of domestic refrigerators has increased in the last few years to a very great extent and, as a result thereof, there has been a steadily increasing tendency for owners of domestic refrigerators to employ these refrigerators for the making of "home-made" frozen confections.

The frozen stick type of confection has enjoyed great commercial success and has proven very popular with the buying public. In spite of the large and increasing popularity of frozen stick confections, and in spite of increasing use of domestic refrigerators for the making of frozen confections, nothing has been done to provide a means whereby the owner of a domestic type of refrigerator may manufacture his own "home-made" frozen stick type confection.

It is therefore a primary object of my invention to provide a mold which may be used in conjunction with a domestic refrigerator for freezing stick type frozen confections.

It is an additional object of my invention to provide a mold of the character set forth in the preceding paragraph which is provided with means for simultaneously making a plurality of such confections.

It is also an object of my invention to incorporate in a mold of the character set forth a means for supporting the handles or sticks which are frozen into the finished product.

It is a further object of my invention to provide a mold of the character set forth hereinbefore which may be easily and inexpensively manufactured so as to make it readily available at low cost to owners of domestic refrigerators.

It is an additional object of my invention to include in a confection mold of the character set forth hereinbefore a means for providing a free circulation of air about the body of the mold to aid in the rapid and uniform freezing of the confection.

Other objects and advantages of my invention will be apparent from a study of the following specification, read in connection with the accompanying drawing, wherein.

Figure 1:
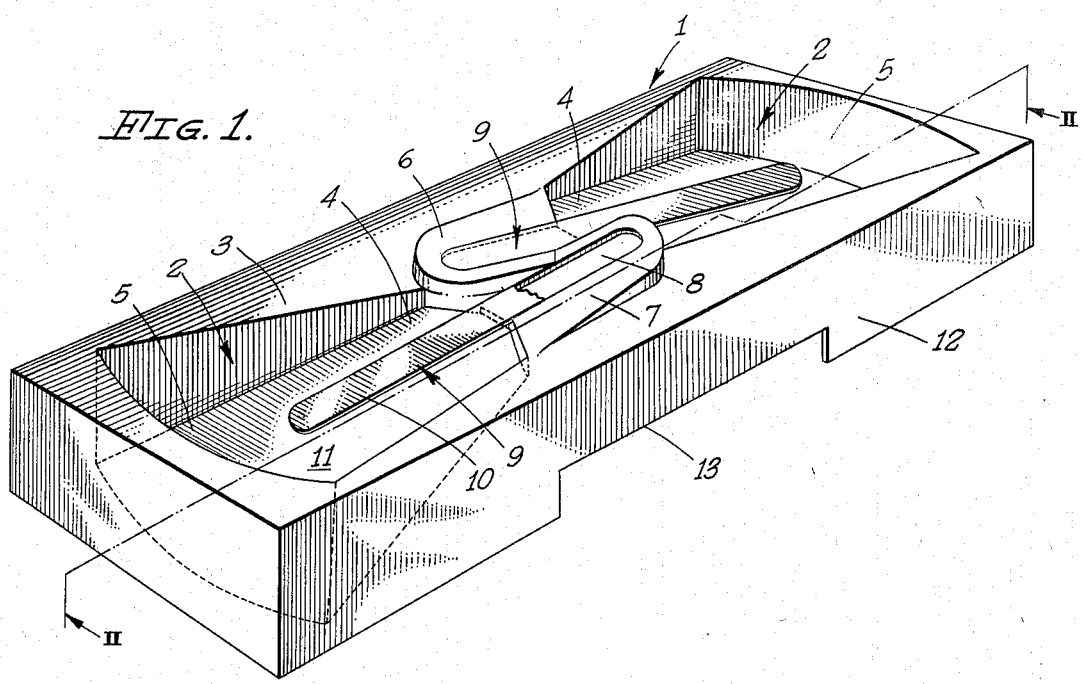
Fig. 1 is a perspective view illustrating one form of my invention and illustrating the appearance of the confection mold and the relation between molding recesses and a handle or stick supporting means.

The preferred form of my invention includes a rectangular block-like body portion 1 which is provided with a pair of recesses 2 disposed in an upper surface 3 thereof. The recesses 2 are preferably provided with a shallow handle end 4 and a deep opposite end 5, the handle end 4 being also made substantially narrower than the opposite end 5. I provide a pair of inclined bosses 6 and 7 which have formed in their upper surface a groove 8 adapted to receive a stick 9. The stick 9 is preferably frozen into the body of the confection so as to serve as a handle therefor while the confection is being consumed. The bosses 6 and 7 are therefore inclined downwardly toward the recesses 2 with which they are associated so that when the stick 9 is inserted in the groove 8, the confection-end 10 of the stick will lie approximately midway between the plane of the upper surface 3 of the mold and the bottom 11 of the recess 2.

In the preferred embodiment of my invention, the part of the stick 9 which is disposed in the recess 2 is somewhat longer than the part carried by the groove 8. Until a liquid is placed in the recess 2, the overbalancing caused by the heavier end of the stick 9 will cause the confection-end 10 thereof to lie on the bottom of the recess 2. Addition of a liquid to the recess 2 will sufficiently buoy up the end of the stick 9 to cause it to assume its proper previously described position. If desired, the stick may be additionally secured by means of elastic bands or suitable clamps to secure the sticks 9 in the grooves 8.

In operation, a suitable liquid, such as ice cream mixture, fruit juices or the like, is used to fill the recesses 2 after which the sticks 9 are placed in the grooves 8 so that the confection-ends 10 thereof are disposed within the body of the liquid in the recesses 2. The charged mold 1 is then placed in the freezing compartment of a domestic refrigerator and allowed to remain until the liquid carried by the recesses 2 is frozen. The dimensions of the block 1 are adjusted to allow the block to freely enter the freezing compartment and provide a free circulation of air thereabout. The large expanse of liquid surface, derived by forming the confection sideways in contra-distinction to endwise, makes for rapid freezing due to the large direct radiating and conducting surface provided.

In order that the frozen finished product may be readily removed from the recesses 2, I prefer to dispose the confection sideways, as shown, instead of endways and to taper the sides of the recesses inwardly. The finished confection may be freed from the mold by warming the mold slightly, the tapered shape of the recesses 2 obviating the necessity for melting any appreciable quantity of the finished product in order to allow it to be removed from the recess in which it is confined.

Figure 2:
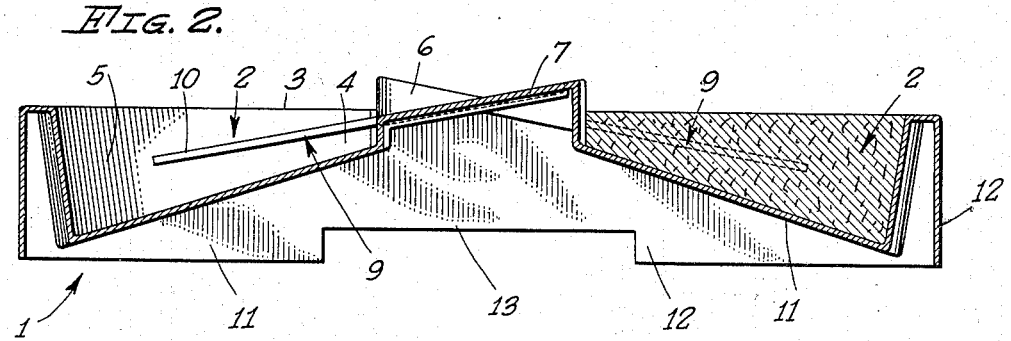
Fig. 2 is a longitudinal section taken substantially along the line II—II of Fig. 1 to show the details of construction of the mold illustrated in Fig. 1.

As illustrated in Fig. 2, I prefer to form the mold of my invention of sheet material so that such a mold may be rapidly and inexpensively manufactured in quantities through the use of well known metal drawing and stamping press and die equipment. It is readily understood, however, that the mold may be formed of cast or plastic material, and inasmuch as some materials, such as rubber, Bakelite, resins, etc., lend themselves well to casting but not to drawing or pressing, and in view of the fact that quantity casting methods are relatively economical, it may be found desirable to form the mold of my invention of this type material in place of the sheet material illustrated.

As shown in Fig. 2, the rectangular block-like shape is obtained by providing a downwardly extending skirt portion 12 on all sides of the mold block 1 and formed integrally with the top surface 3 thereof. In order to provide for free and relatively rapid circulation of air around those parts of the mold which are in contact with the mixture to be frozen, I provide a pair of recesses 13 in the skirt portion 12 and prefer to dispose said recesses on opposite sides of the mold.

It will be observed that I have provided a mold which may be made in a small and compact manner as a result of the overlapping relation of the bosses 6 and 7 provided for supporting the stick handles, and that such a mold may be readily and inexpensively manufactured by any of a number of well known manufacturing processes.

It will also be noted that I have provided in a mold of this type, a means for making a pair of frozen confections simultaneously and have incorporated therewith a means for supporting the stick handles which are frozen in the finished product.

While I have shown and described the preferred embodiment of my invention, I do not desire to be limited to any of the details of construction shown or described herein, except as defined in the appended claims.

I claim:

1. In a mold for the domestic freezing of stick confections, the combination of: a mold body; a recess in said body for retaining confection material to be frozen, said recess having a wide and a narrow end and a sloping bottom to provide greater depth at the wide end than at the narrow end; and a groove in said mold body disposed adjacent said narrow end of said recess for supporting a stick to be frozen into said confection material, said groove being sloped in such a manner as to locate said stick substantially midway between said sloping bottom of said recess and the surface of said confection material.

2. In a mold for the domestic freezing of stick confections, the combination of: a mold body; a pair of recesses in said mold body for retaining confection material to be frozen, each of said recesses having a wide end and a narrow end and being disposed in said mold body angularly with respect to a longitudinal axis thereof and in parallelism relative to each other with said narrow ends in side by side relation; a groove for each of said recesses for supporting a stick to be frozen into said confection material, said grooves being disposed at said narrow end of each of said recesses and extending away from said narrow end, the groove for one of said recesses being disposed in side to side parallel relation with the groove for the other of said recesses.

3. In a mold for use with a domestic refrigerator for freezing stick confections, the combination of: a mold body for insertion into a freezing compartment of said refrigerator; a recess in said mold body for retaining confection material to be frozen; a groove in said mold body for supporting a stick in such a position that one end thereof penetrates said confection material, whereby said stick may be frozen into said confection material and serve as a handle for the finished product; and a means on said mold body defining a passageway thereunder for permitting free air circulation thereabout.

4. In a mold for the domestic freezing of stick confections, the combination of: a mold body; a recess in said body extending from the upper surface of said body for retaining confection material to be frozen, said recess having a wide and a narrow end and a sloping bottom to provide greater depth at the wide end than at the narrow end; and means for supporting a stick upon said mold body at such angle with respect to the sloping bottom of said recess as to locate said stick substantially midway between the sloping bottom of said recess and the surface of said mold body.

KENNETH A. PRICE.